United States Patent
Mahdi

(10) Patent No.: US 11,175,773 B2
(45) Date of Patent: *Nov. 16, 2021

(54) REDUNDANT PROJECTED CAPACITIVE TOUCH PANEL

(71) Applicant: American Panel Corporation, Alpharetta, GA (US)

(72) Inventor: Ken Mahdi, Alpharetta, GA (US)

(73) Assignee: Mercury Mission Systems, LLC, Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,731

(22) Filed: Apr. 23, 2020

(65) Prior Publication Data

US 2020/0249783 A1 Aug. 6, 2020

Related U.S. Application Data

(63) Continuation of application No. 14/876,393, filed on Oct. 6, 2015, now Pat. No. 10,656,767.

(51) Int. Cl.
*G06F 3/041* (2006.01)
*G06F 1/16* (2006.01)
*G06F 3/0488* (2013.01)
*G06F 3/044* (2006.01)

(52) U.S. Cl.
CPC ........ *G06F 3/04166* (2019.05); *G06F 1/1656* (2013.01); *G06F 3/0444* (2019.05); *G06F 3/04886* (2013.01); *G06F 2203/04107* (2013.01); *G06F 2203/04803* (2013.01)

(58) Field of Classification Search
CPC .... G06F 1/1637; G06F 1/1643; G06F 1/1656; G06F 1/169; G06F 1/1692; G06F 3/041; G06F 3/0416; G06F 3/04166; G06F 3/0418; G06F 3/044; G06F 3/0488; G06F 3/04886; G06F 2203/0382; G06F 2203/04107; G06F 2203/04803; G02F 1/13338; G02F 1/133391; G02F 1/1339
See application file for complete search history.

(56) References Cited

U.S. PATENT DOCUMENTS

| | | | |
|---|---|---|---|
| 6,088,069 | A | 7/2000 | Farlow |
| 6,842,672 | B1 | 1/2005 | Straub et al. |
| 9,141,329 | B1 | 9/2015 | Reicher et al. |
| 10,656,767 | B2 * | 5/2020 | Mahdi ................ G06F 3/04166 |
| 2004/0268037 | A1 | 12/2004 | Buchanan, Jr. et al. |
| 2005/0110765 | A1 | 5/2005 | Baeza |
| 2006/0013967 | A1 | 1/2006 | Mikoshiba et al. |

(Continued)

FOREIGN PATENT DOCUMENTS

| | | |
|---|---|---|
| GB | 2510600 A | 8/2014 |
| WO | 2014/185599 A1 | 11/2014 |

*Primary Examiner* — Keith L Crawley
(74) *Attorney, Agent, or Firm* — Standley Law Group LLP; Jeffrey S. Standley; Adam J. Smith

(57) ABSTRACT

An electronic display assembly includes a display layer for displaying an image, a projected capacitive touch panel with touch input areas, each of which are independently operable and configured to receive touch input from a user. Input/output devices are electrically connected with the display layer touch panel. Software instructions, when executed, configure one or more processors to automatically begin utilizing a remaining operable input/output device if one of said input/output devices is rendered inoperable.

17 Claims, 9 Drawing Sheets

(56) References Cited

U.S. PATENT DOCUMENTS

| | | |
|---|---|---|
| 2008/0122376 A1 | 5/2008 | Lys |
| 2008/0158468 A1 | 7/2008 | Kim et al. |
| 2008/0204419 A1 | 8/2008 | Grothe |
| 2008/0218492 A1 | 9/2008 | Endo |
| 2008/0261057 A1 | 10/2008 | Slobodin |
| 2008/0291686 A1 | 11/2008 | Cull et al. |
| 2010/0039366 A1 | 2/2010 | Hardy |
| 2010/0060349 A1 | 3/2010 | Etter |
| 2010/0156795 A1 | 6/2010 | Kim |
| 2010/0164889 A1* | 7/2010 | Hristov .................. G06F 3/0446 345/173 |
| 2010/0271324 A1 | 10/2010 | Hayes |
| 2011/0050617 A1 | 3/2011 | Murphy et al. |
| 2011/0095999 A1 | 4/2011 | Hayton |
| 2012/0105774 A1 | 5/2012 | Fletcher et al. |
| 2012/0173859 A1 | 7/2012 | Wang et al. |
| 2013/0015906 A1 | 1/2013 | Yeh |
| 2013/0100037 A1 | 4/2013 | Mabie |
| 2013/0127790 A1 | 5/2013 | Wassvik |
| 2013/0154994 A1 | 6/2013 | Yang |
| 2013/0265282 A1 | 10/2013 | Nakagawa et al. |
| 2014/0002176 A1 | 1/2014 | Guard |
| 2014/0160365 A1 | 6/2014 | Kwong et al. |
| 2014/0218642 A1 | 8/2014 | Iwami |
| 2014/0320437 A1 | 10/2014 | Kang |
| 2015/0049041 A1 | 2/2015 | Yousefpor |
| 2015/0077370 A1 | 3/2015 | Kim et al. |
| 2015/0193074 A1 | 7/2015 | Cudak et al. |
| 2015/0309660 A1* | 10/2015 | Lee ....................... G06F 3/0418 345/174 |
| 2015/0379964 A1 | 12/2015 | Lee et al. |
| 2016/0300549 A1 | 10/2016 | Zhang |
| 2017/0083151 A1 | 3/2017 | Khazeni et al. |

* cited by examiner

REDUNDANT PROJECTED CAPACITIVE TOUCH PANEL

CROSS-REFERENCE TO RELATED APPLICATIONS

This application is a continuation of U.S. application Ser. No. 14/876,393 filed Oct. 6, 2015, the disclosures of which are hereby incorporated by reference as if fully restated.

TECHNICAL FIELD

Embodiments of the present invention generally relate touch screen displays.

BACKGROUND AND SUMMARY OF THE INVENTION

Electronic touch panel displays are used in many commercial applications including ATMs, automobiles, informational displays, personal computers, cell phones, and the like. Such displays are advantageous as the content may be easily changed and the displays are interactive. For many applications having an electronic touch panel display is desirable, but requirements or needs for redundancy have prevented the use of such displays.

Examples of such applications include, but are not limited to, commercial aviation, space flight, and military applications, where redundancy measures are demanded to ensure continued performance of equipment in the event of a partial failure. In these and other applications there may also be visibility requirements to ensure performance under extreme environmental conditions. These may include ability to withstand high levels of solar loading and visibility in bright ambient conditions. Such stringent requirements are demanded because of the potential consequences of failure. Therefore, it is desirable to provide an electronic touch panel display meeting visibility requirements and having redundancy measures.

Finally, in these and other applications, electromagnetic interference (EMI) and EMC becomes an issue as there are often multiple pieces of electronic equipment operating in close proximity. Each device may emit electromagnetic energy, which can cause EMI with the operation of the other unit resulting in interrupted performance. EMC is the ability for multiple devices to work in the same electromagnetic environment. Therefore, it is additionally desirable to provide the aforementioned electronic touch panel display also having EMC endurance capabilities that limit EMI.

Exemplary embodiments of the present invention may comprise an electronic display housed in a sealed gasket with a projected capacitance touch panel having redundant sensors and input/output devices. The gasket may prevent the display from being compromised by harsh environmental conditions. The display may additionally be comprised of multiple layers adapted to withstand high solar loading and remain visible in high ambient sunlight environments, such as by use of an active matrix liquid crystal display (AMLCD). This display may provide one large, contiguous video image or may provide multiple, independent video images.

The touch panel may comprise circuitry configured to limit EMI and improve EMC. The assembly may additionally comprise shielding between layer of the display and in channels associated with the display, which also limits EMI and improves EMC.

At least two seamless, adjoining grid sections and corresponding touch sensors capable of determining touch screen input are utilized, thus providing a seamless display and interaction experience when viewed and utilized. This also makes the touch panel redundant. For example, without limitation in the event of a failure of one of the grids or the corresponding sensors, the display may automatically shift to display images only on the portion of the display covered by the remaining operable grid/sensor. Further, at least two input/output devices are utilized to ensure that each portion of the display and touch panel can be driven independently from either input/output device. These two measures provide redundancy and preserve the operability of the display under partial failure.

The display may be made such that it is adapted to comply with military specifications for use in military applications, such as aviation.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
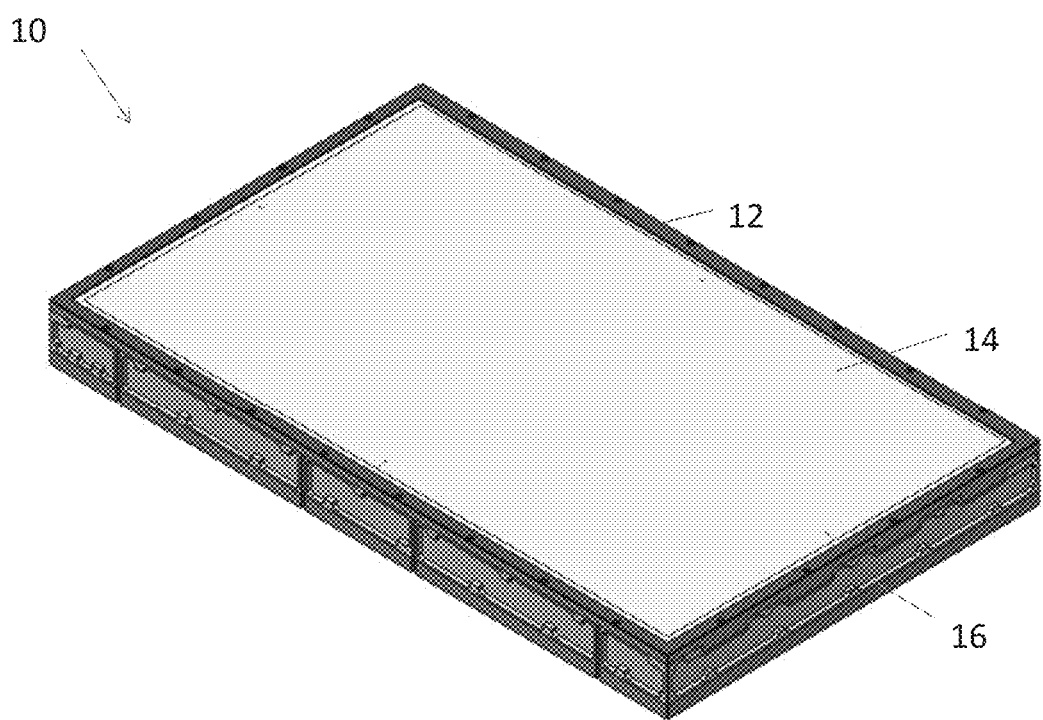
FIG. 1 is a perspective view of an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 through FIG. 4 illustrates an exemplary embodiment of the present invention. An electronic display and touch screen assembly 10 (hereinafter the "assembly") consists of a touch panel 14 located immediately above and extending in parallel with an electronic display 16. In exemplary embodiments of the present invention the electronic display 16 is a normally black liquid crystal display (LCD), such as the AMLCD. Other display types such as plasma, Light Emitting Diode (LED), Cathode Ray Tube (CRT), and the like are contemplated. As will be explained in greater detail in subsequent figures, the touch panel 14 is a projected capacitive touch panel. The touch panel 14 may be wet laminated to the electronic display 16 and a gasket 12 may be provided that frames the touch panel 14 and the electronic display 16 and creates a seal therebetween. Other known methods of joining the touch panel 14 and the electronic display 16 are contemplated. The electronic display 16 may include a heating device (not shown) that permits the touch screen to operate in extreme conditions such as cold weather environments. The touch panel 14 may be in electronic communication with the electronic display 16 by flexible circuit, or the like. The touch panel 14 may be adapted to receive input from, for example, a human finger, including when gloved, or a stylus.

Figure 2:
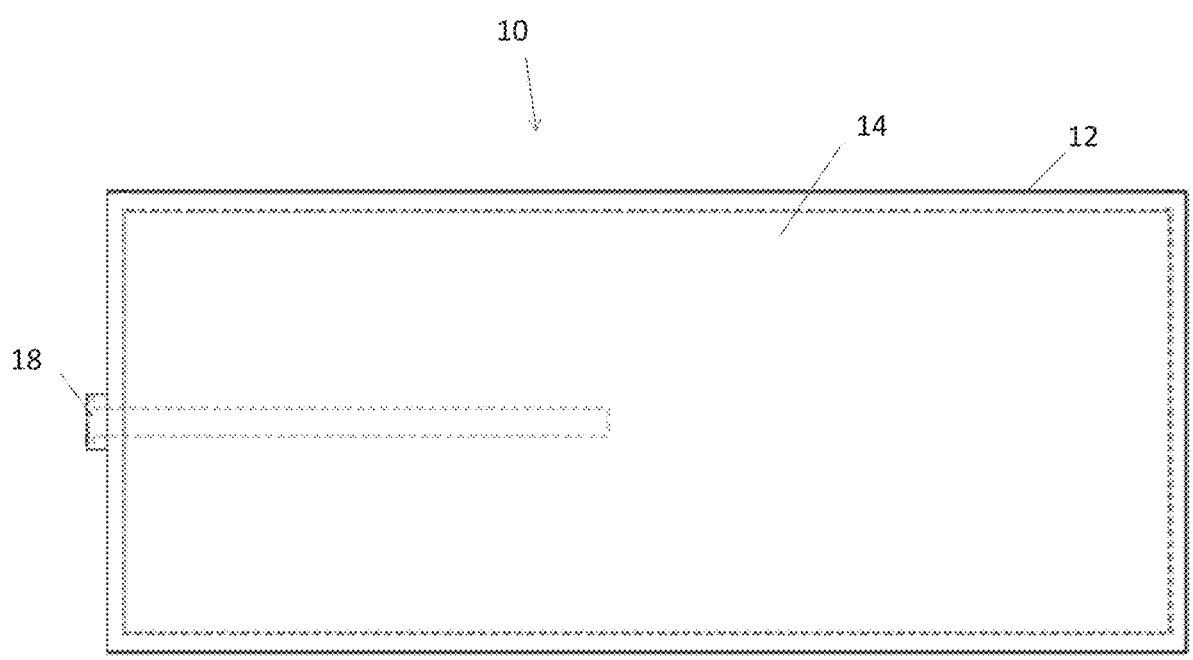
FIG. 2 is a top view of the device of FIG. 1.
Figure 3:
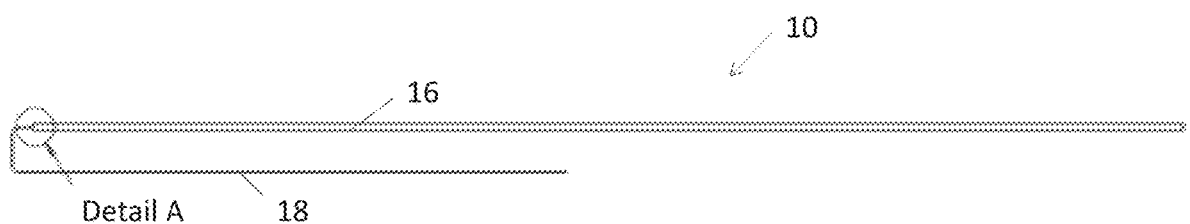
FIG. 3 is a side view of the device of FIG. 1, additionally indicating Detail A.
Figure 4:
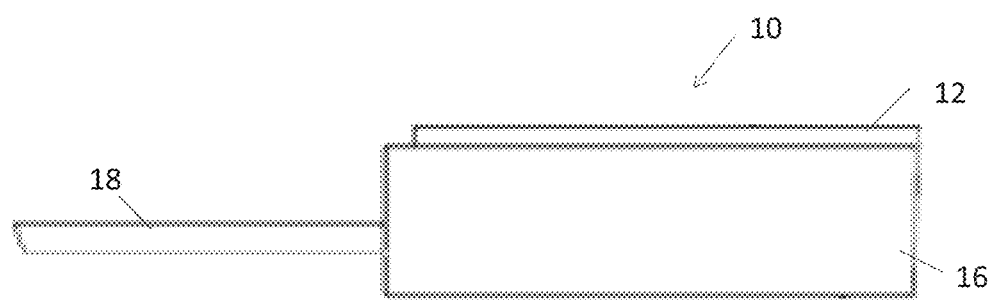
FIG. 4 is a detailed side view of Detail A of FIG. 3.

As best illustrated in FIG. 2 though FIG. 4, the assembly 10 may further comprise a channel 18. The channel 18 may extend from any side of the assembly 10 or from the back thereof. The channel 18 may be configured to permit a pair of independent input/output devices to travel therethrough. When both input/output devices are operable, each may provide input/output signals for a respective portion of the electronic display 16. This provides a redundancy measure such that should one input/output device fail, the remaining operable input/output device may automatically provide input/output signals for the remaining portion of the electronic display 16 and thus maintain the operability of the assembly 10. In other exemplary embodiments of the present invention, each input/output device is capable of providing input/output for the entire electronic display 16.

Figure 5:
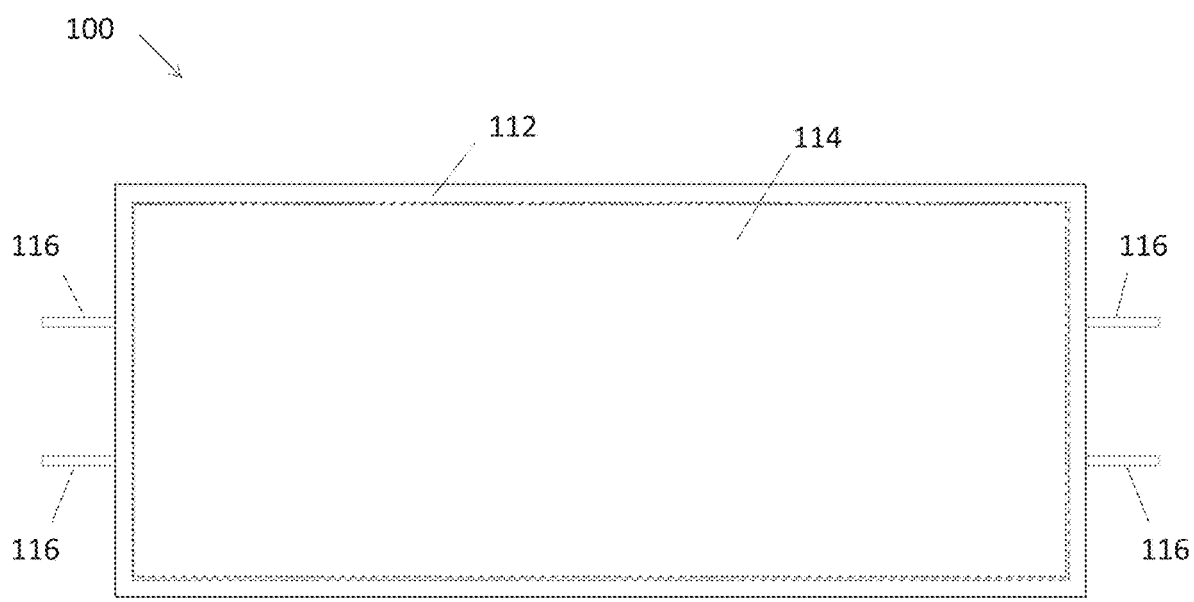
FIG. 5 is a top view of another exemplary embodiment of the present invention.
Figure 6:
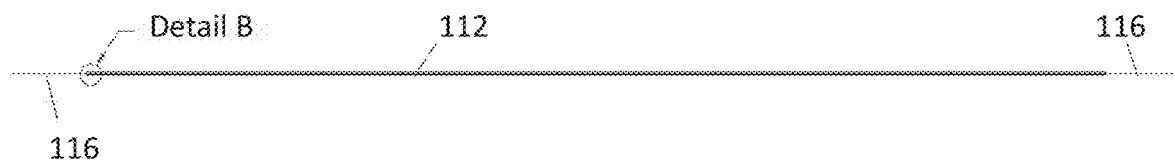
FIG. 6 is a side view of the device of FIG. 5, also indicating Detail B.
Figure 7:
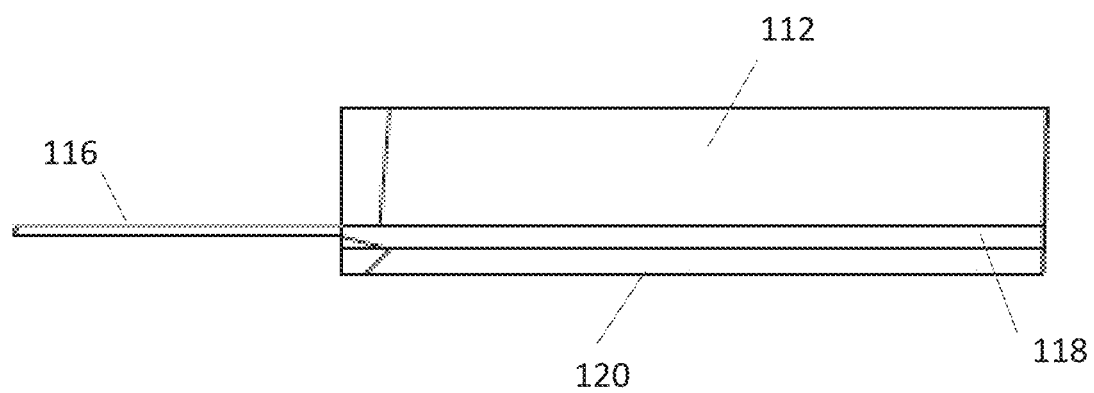
FIG. 7 is a detailed side view of Detail B as indicated in FIG. 6.

FIG. 5 though FIG. 7 illustrate another exemplary embodiment an electronic display and touch screen assembly 100 (hereinafter the "assembly") in accordance with the present invention. The assembly 100 may be comprised of a touch panel 114 located immediately above and extending in parallel with an electronic display 112.

As will be explained in greater detail in subsequent figures, the touch panel 114 is a projected capacitance touch panel. The touch panel 114 may be comprised of a top circuit layer 118 and a bottom circuit layer 120. The top and bottom circuit layers 118 and 120 may be spaced apart or immediately adjacent to one another.

Additionally, the top and bottom circuit layers 118 and 120 may be located spaced apart from or immediately adjacent to the electronic display 112. The touch panel 114 may be wet laminated to the electronic display 112 and a gasket may be provided that frames the two layers and creates a seal between the touch panel 114 and the electronic display 112. Thereby protecting the assembly 100 from harsh environmental conditions and providing durability. Other known methods of joining the touch panel 114 and the electronic display 112 are contemplated. The assembly 100 may include a heating device (not shown) that permits the assembly 100 to operate in extreme conditions such as cold weather environments. The touch panel 114 may be in electronic communication with the electronic display 112 by flexible circuit, or the like.

The assembly 100 may additionally comprise a series of channels 116. The channels 116 may comprise shielding configured to reduce or eliminate EMI and promote EMC. In exemplary embodiment of the present invention, the assembly 100 comprises four channels 116, a pair of which each extend from the left and right sides of the assembly, respectively. However, any number of channels 116 extending from any part of the assembly 100 is contemplated. The channel 116 may be adapted to house a pair of independent input/output devices (not shown), each extending though one of the channels 116. When both input/output devices are operable, each may provide input/output signals for a respective portion of the assembly 100. In exemplary embodiments of the present invention, each controls substantially half of the assembly 100. In such an embodiment, if one input/output device fails, the remaining operable input/output device may provide input/output signals for the remaining half the assembly 100 and thus maintain operability. However, in other exemplary embodiments of the present invention, each input/output device is capable of providing input/output for the entire assembly 100. This provides a redundancy measure. In such an embodiment, if one input/output device fails, the remaining operable input/output device may provide input/output signals for the assembly 100 and thus maintain operability.

In exemplary embodiments of the present invention, the assembly 100 and related components are configured to remain operable in atmospheric pressure conditions ranging from sea level to 55,000 feet altitude, including with a rate of change up to 120 feet per second. Similarly the assembly 100 and related components are configured to withstand 95% humidity, temperature changes between 55 and 90 degrees Celsius (C) at a rate of 40 degrees C. per minute with a maximum operating temperature of −45 degrees C. to 71 degrees C. and prolonged storage temperatures of −55 degrees C. to over 90 degrees C. All coatings and materials in the assembly 100 may be configured to withstand, without degradation, commonly used solvents such as water, acetone, lacquer thinner, optical adhesive, and the like. Similarly, all coatings and materials in the assembly 100 may be configured to withstand, without degradation, commonly used cleaners such as ammonia, detergent, soap, and the like.

Figure 8:
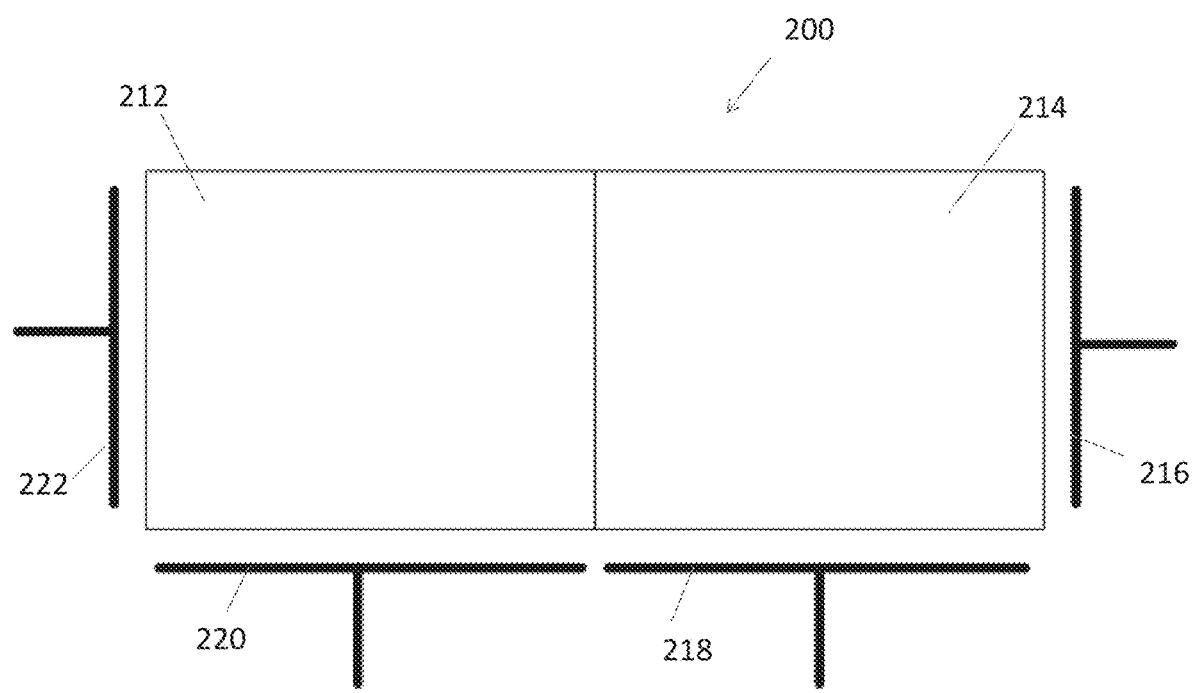
FIG. 8 is a front view of an exemplary touch panel in accordance the present invention.

FIG. 8 is a front view of an exemplary projected capacitive touch panel 200 in accordance with the present invention. The touch panel 200 may comprise a first touch sensor 212 and a second touch sensor 214. The first 212 and the second touch sensors 214 may be located immediately adjacent to one another and provide a seamless touch screen surface that is indistinguishable in functionally to a user. The first 212 and the second touch sensors 214 may additionally be located immediately above the electronic display 112. Each of the first and the second touch sensors 212 and 214 may be in communication with an independent input/output device. In this way, if one input/output device or one touch sensor fails, the remaining touch sensor will remain operable. In exemplary embodiments of the present invention, each of the first and the second touch sensors 212 and 214 may comprise multiple input/output devices, such that if one input/output device fails both touch sensors 212 and 214 will remain operable, thus providing redundancy.

The first touch sensor 212 may additionally comprise a first vertical sensor 222 and a first horizontal sensor 220. The first touch sensor 212 may control a first portion of the touch panel 200. Likewise, the second touch sensor 214 may additionally comprise a second vertical sensor 216 and a second horizontal sensor 218 and control a second portion of the touch panel 200. In exemplary embodiments of the present invention, each of the touch sensors 212 and 214 corresponds to substantially half of the electronic display 16. The vertical touch sensors 216 and 222 may be configured to sense the vertical (Y) location of a touch input, while the horizontal sensors 218 and 220 may be configured to sense the horizontal (X) location of a touch input. The touch panel 200 may be sized to cover the entirety of the electronic display 16 and substantially all of the assembly 100.

In exemplary embodiments of the present invention, the first 212 and second touch sensors 214 may be configured to respond to a stylus or a human finger, including a gloved hand. The first 212 and second touch sensors 214 may be configured to respond to an activation pressure of less than 100 g and may allow for multiple touch inputs to be measured simultaneously. The touch panel 200 may be configured to receive at least ten points of touch simultaneously and respond to pinching and rotational gestures.

The use of the first 212 and the second touch sensors 214 provides a redundancy measure. When both the first 212 and the second touch sensors 214 are operable, the entire touch panel 200 may be utilized. Should one of the first 212 or the second touch sensors 214 be rendered inoperable, the remaining operable touch sensor 212 or 214 may accept touch input for the portion of the touch panel 200 that it controls. For example, if touch sensor 212 fails, the image that was being shown on the entire electronic display 16 may be shifted onto just the portion of the electronic display 16 controlled by the remaining operable touch sensor 214. In this way, the assembly 10 remains fully functional, albeit over a smaller area. In other exemplary embodiments of the present invention, if one of the first 212 or the second touch sensors 214 be rendered inoperable the corresponding portion of the electronic display 16 may simply be turned off. In still other exemplary embodiments, the electronic display 16 may remain unchanged but touch input will only be accepted from the remaining operable touch sensor 212 or 214.

As will be discussed in greater detail in subsequent figures, the touch panel 200 may be utilized in conjunction with a bottom glass layer 320 of an exemplary display panel 300 illustrated in FIG. 9, and each line of the touch panel 200 matrix may comprise an exemplary circuit 400 such as the one illustrated in FIG. 10.

In one exemplary embodiment of the present invention, the touch panel active area may be 506.88 mm×202.75 mm and may have an operating life of over 1 million hits. Other embodiments of the present invention can vary in size, operating life, touch actuation force, etc., at the discretion of the user or manufacturer.

Figure 9:
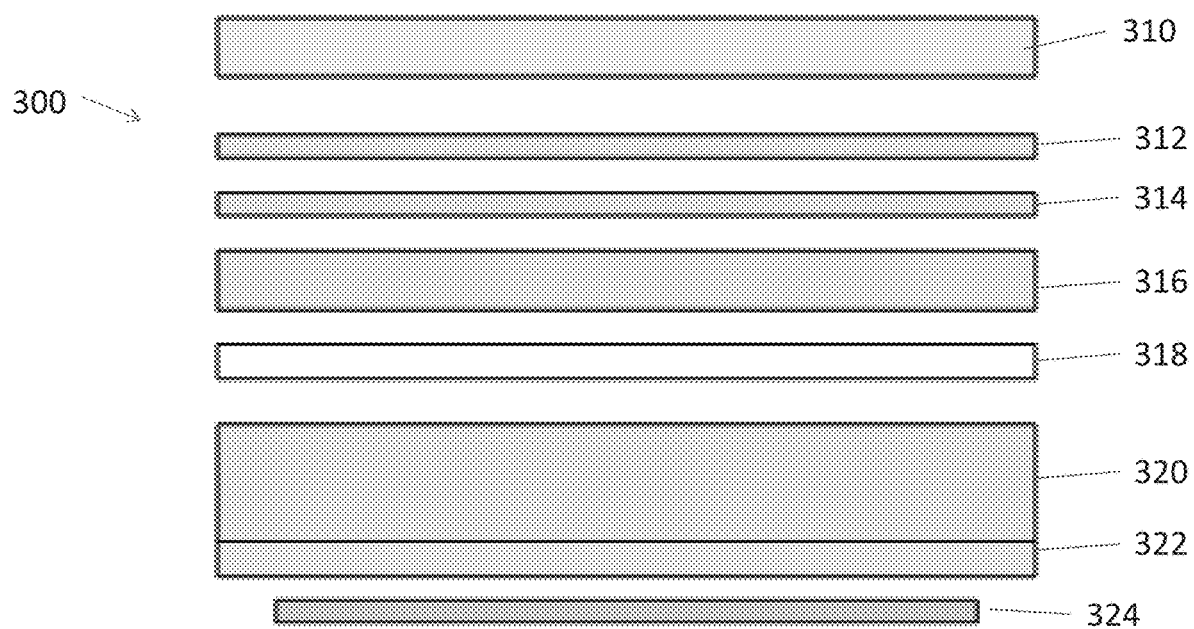
FIG. 9 is an exploded detailed side sectional view of an exemplary embodiment of a display panel in accordance with the present invention.

FIG. 9 is an exploded detailed side sectional view of the exemplary display panel 300 in accordance with the present invention, such for use with the electronic display 16. A cover glass 310 may form the top layer of the display panel 300. The cover glass 310 may comprise an anti-smudge, anti-reflective coating. A linear polarizer 312 followed by a quarter wave retarder 314 may be located below the cover glass 310 and above a top glass 316. The quarter wave retarder 314 may be configured to withstand high temperatures. An optically clear adhesive (OCA) layer 318 may be placed between the top glass 316 and the bottom glass 320.

The bottom glass 320 may be located below the top glass 316 but above an indium tin oxide (ITO) layer 322. In exemplary embodiments of the present invention, the touch panel 200 will be located in the bottom glass 320 layer. The ITO layer 322 may be located immediately below and be affixed to the bottom glass 320. The ITO layer 322 may act as an EMI shielding layer, thus promoting EMC. In exemplary embodiments of the present invention, the ITO layer 322 may extend beyond the bottom glass 320 by 3 mm on all sides. Finally, a final quarter wave retarder 324 may form the bottom layer of the display 300. The final quarter wave retarder 324 may have a smaller area than the previous layers, which may all have substantially the same surface area. Such a configuration permits the display panel 300 to be visible in high ambient light conditions and operable under high levels of solar loading. In exemplary embodiments of the present invention the display panel 300, the assembly 100, and other related components are configured to withstand prolonged exposure to solar radiation with a normal flux of 260 BTU/ft$^2$ at sea level atmospheric pressure and 55 degrees C.

Each of these layers may extend in parallel with the other layers. Each of these layers may also be spaced apart from one another and be of various thicknesses. In exemplary embodiments of the present invention, the layers may be immediately adjacent to, secured to, or integrally formed with one another. In exemplary embodiments of the present invention, the cover glass 310 may be a 0.15 mm micro sheet. In other embodiments, the cover glass 310 may be 0.5 mm thick. The top glass 316 may also be 0.15 mm thick, while the bottom glass may be 1.1 mm thick. The ITO layer 322 may be 3 mm thick. While these thicknesses are exemplary, they are not intended to be limiting, any functional thicknesses are contemplated. It is also notable that adhesive layers may be placed between any of the layers of the display panel 300.

It is notable that while exemplary display panel 300 may be described in terms of operating with a particular embodiment described herein, it is contemplated that the display panel 300 may be utilized with any of the embodiments described herein.

Figure 10:
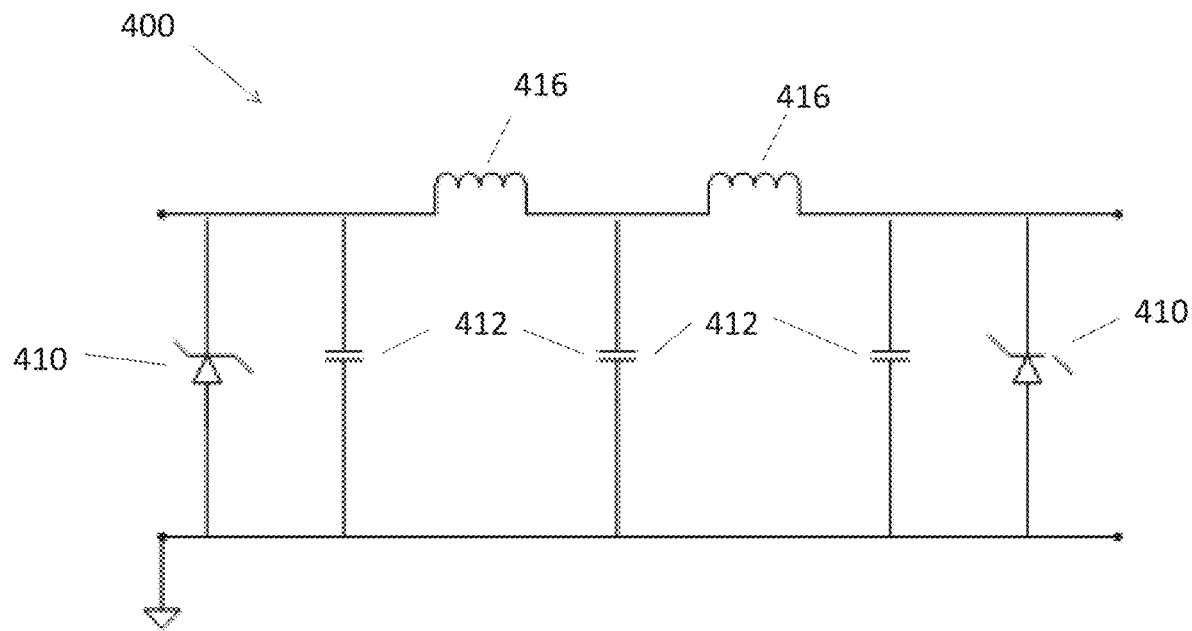
FIG. 10 is a plan view of an exemplary circuit in accordance with the present invention.

FIG. 10 illustrates an exemplary circuit 400 in accordance with the present invention. The exemplary circuit 400 is configured to minimize EMI and maximize EMC. Each of the touch sensors 214 and 212 may be comprised of the circuit 400. It is contemplated that any number of the circuits 400 may be utilized in communication with one another.

The circuit 400 may be used with the assembly 10 or the assembly 100 in conjunction with the touch panels 14 and 114, respectively. It is notable that while exemplary circuit 400 may be described in terms of operating with a particular embodiment described herein, it is contemplated that the circuit 400 may be utilized with any of the embodiments described herein.

The circuit 400 may comprise a pair of zener diodes 410 in parallel with and located on either side of a series of capacitors 412. An inductor 416 may be placed in series between each capacitor 412. In exemplary embodiments of the present invention, three capacitors 412 are placed in parallel, and an inductor 416 is placed in series between each of said capacitors 412. Other arrangements are contemplated.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. An electronic display assembly with redundancy features comprising:
    a display layer for displaying images;
    a projected capacitive touch panel comprising:
        a first and second touch input area;
        a first vertical touch sensor provided along a vertical side edge of said first touch input area for detecting a vertical location of touch input at any location of said first touch input area;
        a second vertical touch sensor provided along a vertical side edge of said second touch input area for detecting a vertical location of touch input at any location of said second touch input area;
        a first horizontal touch sensor provided along a horizontal edge of said first touch input area for detecting a horizontal location of touch input at said first touch input area; and
    a second horizontal touch sensor provided along a horizontal edge of said second touch input area for detecting a horizontal location of touch input at any location of said second touch input area;
    wherein each of said first and second touch input areas are distinct, independently operable, and configured to receive touch input from a user;
    a first input/output device electrically connected with said display layer and said first vertical touch sensor, said first horizontal touch sensor, said second vertical touch sensor, and said second horizontal touch sensor;
    a second input/output device electrically connected with said display layer and said second vertical touch sensor, said second horizontal touch sensor, said first vertical touch sensor, and said first horizontal touch sensor;
    one or more processors; and
    one or more electronic storage devices comprising software instructions, which when executed, configure said one or more processors to automatically begin utilizing a remaining operable one of said first and second input/output devices if another one of said first and second input/output devices is rendered inoperable.

2. The electronic display assembly of claim 1 wherein:
    said touch panel is coextensive with said display layer; and
    said first and second touch input areas are located immediately adjacent to one another such that the projected capacitive touch panel presents a seamless appearance that is functionally indistinguishable across the first and second touch input areas.

3. The electronic display assembly of claim 2 further comprising:
    additional software instructions stored at the one or more electronic storage devices, which when executed, configure the one or more processors to, upon failure of one of said first and second touch input areas, automatically display the images on only a portion of the display layer corresponding to a remaining operable one of said first and second touch input areas.

4. The electronic display assembly of claim 1 wherein:
    said first and second touch input areas comprise distinct and physically separate touch pads.

5. The electronic display assembly of claim 1 further comprising:
    a housing for said display layer, said projected capacitive touch panel, said one or more processors, and said one or more electronic storage devices.

6. The electronic display assembly of claim 5 wherein:
    said housing is adapted to be secured within a cockpit of a vehicle.

7. The electronic display assembly of claim 6 further comprising:
    one or more channels extending through a wall of said housing, wherein said first and second input/output devices are located within said one or more channels; and
    electromagnetic shielding located about each of said one or more channels.

8. The electronic display assembly of claim 7 further comprising:
    a gasket configured to secure said display layer and said projected capacitive touch panel in a watertight fashion within said housing.

9. The electronic display assembly of claim 1 wherein: said display layer comprises liquid crystals.

10. The electronic display assembly of claim 1 further comprising:
    an optical stack comprising:
        the display layer;
        the projected capacitive touch panel;
        a linear polarizer
        a cover layer comprising an anti-reflective, anti-smudge coating;
        a first quarter wave retarder;
        a top glass;
        an optically clear adhesive;
        a bottom glass;
        an indium tin oxide layer; and
        a second quarter wave retarder.

11. The electronic display assembly of claim 1 wherein:
    each of the first and second touch input areas comprise a series of electronic circuits; and
    each of the electronic circuits comprise:
        a first terminal;
        a second terminal;
        a third terminal;
        a number of zener diodes, each coupled between said first terminal and said third terminal;
        a number of capacitors, each coupled between said first terminal and said third terminal, wherein each of said capacitors is coupled in parallel with each of said zener diodes;
        a first inductor coupled in series between said first terminal and said second terminal;

a second inductor coupled in series between said first terminal and said second terminal, wherein said second inductor is coupled in series with said first inductor; and a second capacitor coupled between said first terminal and said third terminal, wherein said second capacitor is coupled in series with only said first and second inductors.

12. An electronic display assembly with redundancy features comprising:

a display layer for displaying an image;

a projected capacitive touch panel coextensive with said display layer and comprising:

a plurality of touch input areas;

a plurality of vertical touch sensors, each configured to detect a vertical location of touch input with at least one associated one of said plurality of touch input areas at any location of the at least one associated one of said plurality of touch input areas;

a plurality of horizontal touch sensors, each configured to detect a horizontal location of touch input with at least one associated one of said plurality of touch input areas at any location of the at least one associated one of said plurality of touch input areas; and wherein each of said plurality of touch input areas are distinct and independently operable and configured to receive touch input from a user;

a housing for said display layer and said projected capacitive touch panel;

a plurality of input/output devices, each of which is electrically connected with said display layer and each of said plurality of vertical touch sensors and said plurality of horizontal touch sensors of each of said plurality of touch input areas;

one or more channels, each extending through said housing and comprising electromagnetic shielding, wherein each of said plurality of input/output devices extend through at least one of said one or more channels;

at least one processor; and at least one electronic storage device comprising software instructions, which when executed, configure said at least one processor to automatically begin utilizing an operable one of said plurality of input/output devices electrically connected with a given one of said plurality of touch input areas when another one of said plurality of input/output devices electrically connected to said given one of said plurality of touch input areas is determined to be inoperable.

13. The electronic display assembly of claim 12 further comprising:

additional software instructions stored at the at least one electronic storage device, which when executed, configure the at least one processor to, upon failure of one of said plurality of touch input areas, automatically display the image on only the portion of the display layer corresponding to one or more remaining operable ones of said plurality of touch input areas.

14. The electronic display assembly of claim 12 wherein:

each of the plurality of touch input areas comprise a series of electronic circuits; and each of the electronic circuits comprise:

a first terminal;

a second terminal;

a third terminal;

a number of zener diodes, each coupled between said first terminal and said third terminal;

a number of capacitors, each coupled between said first terminal and said third terminal, wherein each of said capacitors is coupled in parallel with each of said zener diodes;

a first inductor coupled in series between said first terminal and said second terminal;

a second inductor coupled in series between said first terminal and said second terminal, wherein said second inductor is coupled in series with said first inductor; and a second capacitor coupled between said first terminal and said third terminal, wherein said second capacitor is coupled in series with only said first and second inductors.

15. A method for reducing electromagnetic interference in an electronic display assembly having redundancy features, said method comprising the steps of:

providing an image at a display layer;

accepting touch input at a projected capacitive touch panel comprising multiple touch input areas, wherein each of said multiple touch input areas are distinct and independently operable, wherein each of said multiple touch input areas comprise at least one associated vertical touch sensor and at least one associated horizontal touch sensor for detecting horizontal and vertical locations, respectively, of touch input at any location of said multiple touch input areas, and wherein each of said multiple touch input areas is electrically connected with at least two input/output devices;

extending each of said input/output devices through one or more shielded channels which extend through a housing for said display layer and said projected capacitive touch panel;

determining that one of said input/output devices for a particular one of the multiple touch input areas is no longer operable; and utilizing a remaining operable one of said input/output devices also connected to said particular one of the multiple touch input areas.

16. The method of claim 15 further comprising the steps of:

determining that a failure event has occurred at of one of said multiple touch input areas; and displaying the image on only a portion of the display layer corresponding to remaining operable ones of said multiple touch input areas.

17. The method of claim 16 further comprising the steps of:

securing the housing with a cockpit of a vehicle; and securing additional electronic equipment devices which produce electromagnetic energy within said cockpit.

* * * * *